F. WILLSON & N. BOURQUIN.
EYE SHIELD PROTECTING SPECTACLES.
APPLICATION FILED APR. 21, 1913.
1,161,100. Patented Nov. 23, 1915.
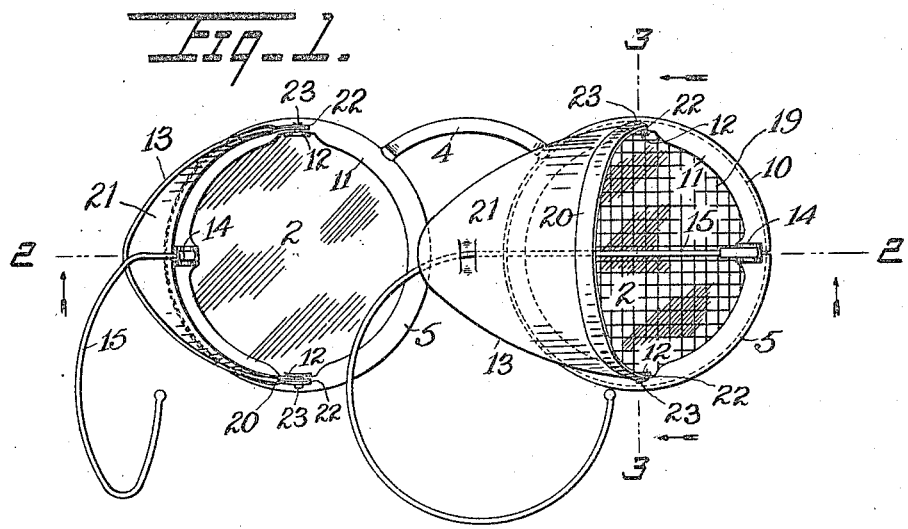
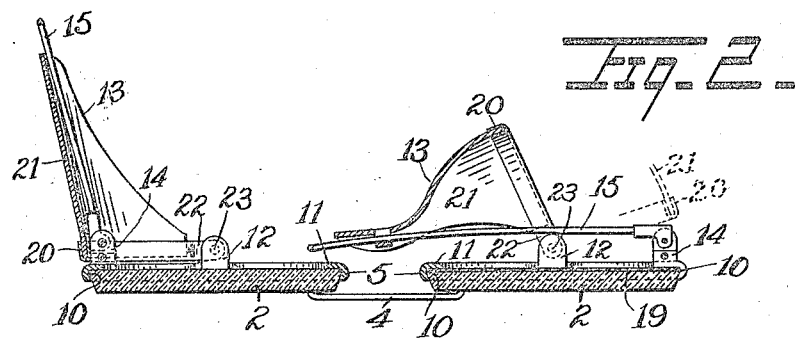
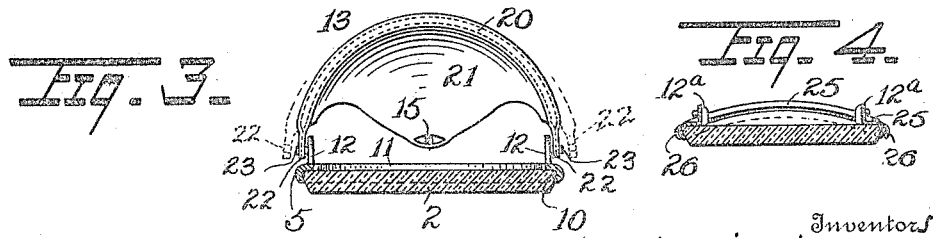

UNITED STATES PATENT OFFICE.

FREDERICK WILLSON AND NUMA BOURQUIN, OF READING, PENNSYLVANIA, ASSIGNORS TO T. A. WILLSON & CO., INC., OF READING, PENNSYLVANIA, A CORPORATION OF PENNSYLVANIA.

EYE-SHIELD PROTECTING-SPECTACLES.

1,161,100.      Specification of Letters Patent.      Patented Nov. 23, 1915.

Application filed April 21, 1913. Serial No. 762,486.

*To all whom it may concern:*

Be it known that we, FREDERICK WILLSON and NUMA BOURQUIN, both citizens of the United States, residing at Reading, in the county of Berks and State of Pennsylvania, have invented certain new and useful Improvements in Eye-Shield Protecting-Spectacles, of which the following is a specification.

This invention relates particularly to eye-protecting spectacles.

A main object of the invention is to provide conveniently removable folding side shields spring-engaged to the lens framings and adapted to inclose the temple connections when in position for use.

The invention is fully described in connection with the accompanying drawings, and the novel features are specifically pointed out in the claims.

Figure 1 is a rear view of spectacles embodying our invention in preferred form, the temple and eye-shield on one side being shown in position for use, and on the other folded against the inner face of the lens. Fig. 2 is a longitudinal section on the line 2—2 of Fig. 1. Fig. 3 is a cross-sectional view on the line 3—3 of Fig. 1. Fig. 4 indicates a modification.

The lenses 2, 2 as shown, are of large size and unusual thickness so as to provide efficient protection for the eyes of the wearer against contacting material; and they are separated by a bridge bar 4 connecting the lens-encircling frames 5, 5 so that the latter may be arranged to bear upon opposite sides of the nose for proper support.

Each lens frame 5 is preferably formed, as shown, from a punched blank of sheet metal, which is shaped to encircle the lens, and to provide in cross-section a lens-edge-engaging groove 10 and a flat lens-face-contacting flange 11; said flange being provided with oppositely arranged inturned pivot-ears 12, 12 for connecting the side eye shield 13, and with an intermediate temple-joint end-piece 14 for the temple 15. This flange 11 lies against the inner face of the lens, on the marginal portion thereof, and serves to largely insure the wearer against injury due to possible fracture of the lens by contact of any substance with its exterior face. Even if the lens be thus fractured the marginal portions of it will be so retained by the flange 11 as to prevent injury to the wearer; while any contacting substance is left free to glance off from the outer face of the lens inasmuch as this projects beyond the plane of the lens-edge-engaging grooved portion 10 of the framing. Where there is special danger of the lens being fractured in service, we provide for further security against injury to the wearer, by clamping between the inner face of the lens and the framing flange 11, a wire screening 19 as indicated to the right of Fig. 1 and to the right in the cross-sectional Fig. 2. Both the pivot ears 12, 12, and the temple joint end piece 14, are arranged within the marginal portion of the frame, 5, the side-shields 13, as hereafter described, being arranged to seat upon said marginal portion outside of said end-piece.

The side shields 13 are shaped as usual to close the space between the lenses and the face of the wearer, each comprising a semi-circular base piece 20 and a triangularly shaped piece 21 of leather, wire gauze, or the like secured thereto. The curved base piece 20 is preferably made of metal, forming a relatively stiff but flexible frame-connecting part adapted to be sprung into or out of engagement with the pivot ears 12, 12 and temple-joint end piece 14. The spread ends 22, 22 of said base piece are provided with pivot eyes which are adapted to spring into engagement with rigid pivot pins or trunnions 23, 23 on the ears 12, 12, so as to hinge the shield to the frame 5, but which are readily sprung apart, normally, so as to permit disengagement of the shield when desired. When thus hinged to the frame 5 the curved shield 13 extends around or outside of the temple-joint piece 14 and the pivot-end portion of the temple 15, and is free to fold inward with the latter against the inner face of the lens, as shown to the right of Figs. 1 and 2; while when swung outward with the temple, for use, it is adapted to exteriorly engage the temple-joint end piece 14, in being forced down to its seat upon the marginal portion of the frame 5; the spring of the base piece permitting of such engagement and snugly holding it in position, and at the same time tensioning the hinged connection of its spread ends 22, 22 to the pivot ears 12, 12 so as to prevent disconnection when in service position.

The temple joint end piece 14 and the adjacent portion of the temple 15, are covered by the side guard 13 when in service, thus protecting the same and presenting a neat appearance; and the guards are firmly retained in position, yet may be readily disengaged and new ones substituted when desired, thereby greatly extending the satisfactory service of the spectacle.

In the modification shown in Fig. 4 the lens-framing piece 25, with its integrally formed shield pivoting ears 12ª, is adapted for use in connection with an ordinary eye-wire 26 by means of which it is clamped to the lens.

What we claim is:—

1. In eye shield spectacles, the combination with a lens framing having shield pivot ears, of a removably hinged spring-frame shield having a trunnion engagement with said ears.

2. In eye shield spectacles, the combination with a lens framing having shield pivot ears and a temple joint piece, of a removably hinged spring-frame shield having a trunnion engagement with said ears and adapted to be sprung into and out of engagement with said temple joint piece.

3. Eye shield spectacles having temples and eye shields separately hinged thereto, the shields being arranged to inclose pivot-end portions of the temples when the parts are spread for service, and to fold down upon the folded temples.

4. In eye shield spectacles, the combination with a lens framing, of a temple and a shield separately hinged thereto, said shield being adapted to inclose the temple joint and having a spring engagement therewith.

5. In eye shield spectacles, a sheet metal lens-frame formed with a lens-edge-engaging groove and having oppositely arranged shield pivot ears, and a removably-hinged shield having a resilient semi-circular base portion the spread ends of which are adapted to be sprung into and out of trunnioned engagement with said ears.

6. In eye shield spectacles, a sheet metal lens-frame formed with a lens-edge-engaging groove and a flat lens-face-contacting flange having oppositely arranged shield pivot ears, and a removably-hinged shield having a resilient semi-circular base portion the spread ends of which are adapted to be sprung into and out of trunnioned engagement with said ears.

7. In eye shield spectacles, a sheet metal lens-frame formed with a lens-edge-engaging groove and having oppositely arranged shield pivot ears and a temple-joint piece, and a removably hinged shield having a resilient semi-circular base portion the spread ends of which are adapted to be normally sprung into and out of pivotal engagement with said ears and the intermediate portion of which is adapted to be sprung into and out of engagement with said temple-joint piece.

8. In eye shield spectacles, a sheet metal lens-frame formed with a lens-edge-engaging groove and a flat lens-face flange, and a protecting screen having its edge portion clamped between said flange and the face of the lens.

9. In eye protection spectacles, a lens-edge-engaging framing lying wholly rearward of the front face of the lens and comprising an inwardly-turned marginal flange arranged in lens-reinforcing contact with the rear face of the lens substantially as and for the purpose set forth.

10. A frame having lens rims, temple wires pivotally connected with said rims, and eye-shields pivotally connected with said rims, and respectively curved around the outside of said temple wires, and movable with respect to said temple wires and rims.

11. A frame having lens rims, temple wires pivotally connected with said rims, and shields hingedly connected with said rims and respectively embracing said temple wires, forming braces therefor when in open position, and holding said wires in closed position.

In testimony whereof we affix our signatures in presence of two witnesses.

FREDERICK WILLSON.
NUMA BOURQUIN.

Witnesses:
D. W. STEWART,
W. G. STEWART.